(No Model.)

J. W. BROWN.
SPRING VEHICLE.

No. 357,173. Patented Feb. 8, 1887.

WITNESSES

INVENTOR
John W. Brown.

Attorneys

UNITED STATES PATENT OFFICE.

JOHN W. BROWN, OF POLO, ILLINOIS.

SPRING-VEHICLE.

SPECIFICATION forming part of Letters Patent No. 357,173, dated February 8, 1887.

Application filed July 12, 1886. Serial No. 207,835. (No model.)

*To all whom it may concern:*

Be it known that I, JOHN W. BROWN, a citizen of the United States, residing at Polo, in the county of Ogle and State of Illinois, have invented certain new and useful Improvements in Spring-Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to certain improvements in buggies, spring-wagons, and other spring-vehicles; and it consists especially in the provisions of a novel body-loop or jack-iron for suspending the body of the vehicle on the spring.

The mode heretofore usually adapted for attaching the body of the vehicle to the spring has been by the interposition of what is known as a "spring-bar," being a short timber clipped at its center on the spring, on the ends of which, by the means of short body-loops, the bed or body was suspended at its several corners. This spring-bar, to avoid a clumsy appearance, was necessarily made light and comparatively weak. The attachment of the body at the ends of said bar gave the weight of such body and its occupants a leverage on the attached center of such bar, and in the lateral oscillation of the vehicle such leverage was of a wrenching character, and the bar was likely to break or work loose at its central connection to the spring.

In my invention I dispense entirely with the spring-bar and attach my loop centrally and directly to the spring, thus reducing not only the number of parts, but what is equally as important, the number of attachments.

My invention is applicable to vehicles supported on side springs, as well as to those supported on end springs. In fact, with certain obvious modifications, it can be applied to any spring-vehicle.

As my invention has reference only to the connection between the body and the spring, I do not deem it essential to show or describe the residue of the vehicle further than to make the application and operation of my improvement intelligible.

Figure 1:
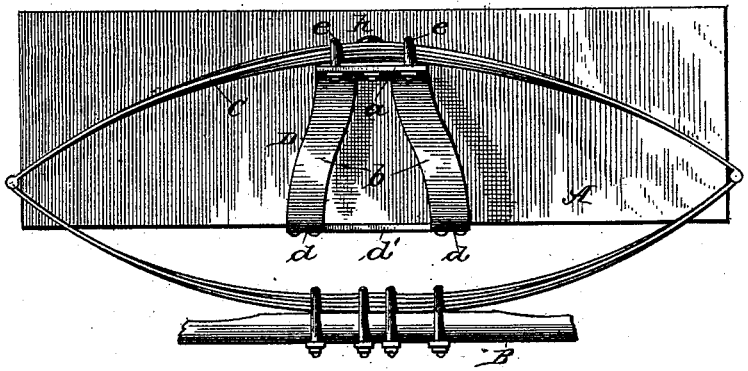
Figure 2:
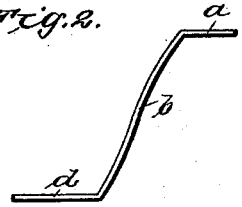
Figure 3:
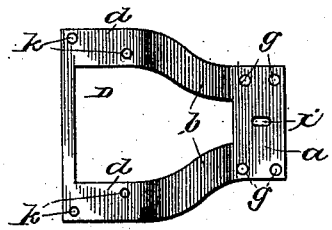

In the drawings, Figure 1 is an end view of a portion of a vehicle provided with my invention, exhibiting its location relative to the adjacent parts. Figs. 2 and 3 are views of my improved loop detached from the vehicle.

A represents any form of the body of a vehicle. B is the usual axle, supported at each end upon carrying-wheels. (Not shown.) C is the ordinary elliptic spring. D is my improved loop. The latter is constructed of a horizontal upper portion, $a$, projected outward, an intermediate nearly vertical portion, $b$, inclined somewhat inward as it descends, and horizontal portions $d$, projected inward or under the vehicle, forming a seat for the body of the latter, and mutually connected by narrow cross-brace $d'$. The portion $a$ is of one solid piece. The parts $b$ and $d$ are bifurcations from the part $a$. The part $a$ is placed either over or directly under the upper portion of the spring C, and attached thereto by clips $e\ e$, encircling the spring, and having their open ends passed through holes $g\ g$ in the part $a$, and a vertical bolt, $h$, passed through the central slotted hole, $i$, in the part $a$. The hole $i$ is slotted or lengthened transversely of the spring C, to permit proper adjustment of the clips $e$ and to compensate for inequalities in the width of the leaves of different springs.

The part $d$ of the loop D is passed under the body or bed of the vehicle, and fastened thereto by bolts passed vertically through the floor of such body and the holes $k\ k$ in the part $d$.

The loop D is made of iron or steel, is very strong, and if placed under the upper portion of the spring is, except as to its central portion, substantially concealed. The central portion, if desired, can be more or less ornamental. By extending the length of the central portion, $b$, the vehicle can be hung as low as desired, irrespective of the height of the springs. The loop D also, by reason of its rigidity and direct attachment to the body, largely strengthens the springs against twisting or bending, particularly in the line of the vehicle.

What I claim as my invention, and desire to secure by Letters Patent of the United States, is—

In a spring-vehicle, the combination of the body A, spring C, suitably supported on the axle B, and the loop D, the latter having the following conformation and parts integral with each other, to wit: the upper portion, a, projected outward, and adapted to be attached to the under surface of the upper side of said spring, the bifurcations b, extending diagonally downward and forward, and each terminating in the horizontal portions d, projected beneath the body A and attached to the latter, whereby such loops have the double function of supporting said body and serving as end braces therefor, substantially as shown, and for the purpose described.

In testimony whereof I affix my signature in presence of two witnesses.

JOHN W. BROWN.

Witnesses:
B. H. BARBER,
M. M. TRUMBAUER.